US010129348B2

United States Patent
Sullivan et al.

(10) Patent No.: US 10,129,348 B2
(45) Date of Patent: Nov. 13, 2018

(54) METHOD AND APPARATUS FOR MODIFYING BEHAVIOR OF A USER VIA A NETWORK

(71) Applicant: AT&T Intellectual Property I, L.P., Atlanta, GA (US)

(72) Inventors: Marc Andrew Sullivan, Austin, TX (US); Greg W. Edwards, Austin, TX (US); James H. Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 201 days.

(21) Appl. No.: 14/959,728

(22) Filed: Dec. 4, 2015

(65) Prior Publication Data
US 2017/0163750 A1    Jun. 8, 2017

(51) Int. Cl.
| G06F 15/16 | (2006.01) |
| H04L 29/08 | (2006.01) |
| H04L 12/26 | (2006.01) |
| H04L 12/18 | (2006.01) |
| H04W 4/029 | (2018.01) |
| H04W 4/38 | (2018.01) |
| H04W 4/00 | (2018.01) |
| H04W 4/02 | (2018.01) |

(52) U.S. Cl.
CPC .......... *H04L 67/22* (2013.01); *H04L 12/1831* (2013.01); *H04L 29/08558* (2013.01); *H04L 43/10* (2013.01); *H04L 67/12* (2013.01); *H04L 67/125* (2013.01); *H04L 67/26* (2013.01); *H04L 67/306* (2013.01); *A23V 2200/334* (2013.01); *H04W 4/006* (2013.01); *H04W 4/028* (2013.01); *H04W 4/029* (2018.02); *H04W 4/38* (2018.02)

(58) Field of Classification Search
CPC .......... A61F 7/00–2007/0098; H04L 12/2803; H04L 29/08558–29/08567; H04L 67/12; H04L 67/125; H04L 12/1831; H04L 67/22; H04L 67/306; H04W 4/029; H04W 4/38
See application file for complete search history.

(56) References Cited

U.S. PATENT DOCUMENTS

| 5,501,697 | A | * | 3/1996 | Fisher | ..................... A61B 17/00 606/204 |
| 5,792,210 | A | * | 8/1998 | Wamubu | ................. A61N 1/205 607/58 |
| 7,751,894 | B1 | | 7/2010 | Freeberg | |
| 8,560,344 | B2 | | 10/2013 | Earles et al. | |
| 8,797,166 | B2 | | 8/2014 | Triener | |

(Continued)

OTHER PUBLICATIONS

Riboni, Daniele, "From Lab to Life: Fine-grained Behavior Monitoring in the Elderly's Home". Mar. 2015. pp. 1-6.

*Primary Examiner* — Brendan Y Higa

(57) ABSTRACT

A method and apparatus for modifying a behavior of a user are disclosed. For example, the method determines a baseline of a behavior to be modified for a user, the baseline comprising at least one triggering event that is established for the behavior to be modified and at least one action to be taken when the at least one triggering event is detected, detects the at least one triggering event that is established for the behavior to be modified for the user, identifies the at least one action to be performed when the at least one triggering event is detected, and performs the at least action that is identified.

20 Claims, 3 Drawing Sheets

(56) References Cited

U.S. PATENT DOCUMENTS

| | | | |
|---|---|---|---|
| 2004/0249250 A1 | 12/2004 | McGee et al. | |
| 2007/0168501 A1 | 7/2007 | Cobb et al. | |
| 2007/0208263 A1* | 9/2007 | John | A61B 5/0452 600/509 |
| 2009/0240312 A1* | 9/2009 | Koewler | A61B 5/01 607/104 |
| 2010/0267361 A1* | 10/2010 | Sullivan | G01S 19/17 455/404.2 |
| 2010/0274366 A1* | 10/2010 | Fata | G05B 15/02 700/7 |
| 2011/0181421 A1* | 7/2011 | Nabata | A24F 47/00 340/573.1 |
| 2011/0183305 A1* | 7/2011 | Orbach | A61B 5/16 434/236 |
| 2013/0013327 A1* | 1/2013 | Horseman | G06F 19/3418 705/1.1 |
| 2013/0054735 A1* | 2/2013 | Chu | G06F 9/5022 709/217 |
| 2013/0216989 A1 | 8/2013 | Cuthbert | |
| 2013/0226263 A1* | 8/2013 | Kelly | A61N 1/37264 607/59 |
| 2013/0297536 A1 | 11/2013 | Almosni et al. | |
| 2014/0104436 A1* | 4/2014 | Bork | H04N 5/58 348/184 |
| 2014/0247155 A1 | 9/2014 | Proud | |
| 2014/0247146 A1 | 11/2014 | Proud | |
| 2015/0094914 A1* | 4/2015 | Abreu | B60H 1/00742 701/41 |
| 2015/0185713 A1 | 7/2015 | Glickfield et al. | |
| 2015/0223705 A1* | 8/2015 | Sadhu | G01S 19/17 600/301 |
| 2015/0257681 A1* | 9/2015 | Shuster | A61B 5/1123 600/301 |
| 2015/0262429 A1* | 9/2015 | Shuster | A61B 5/1123 345/633 |

* cited by examiner

METHOD AND APPARATUS FOR MODIFYING BEHAVIOR OF A USER VIA A NETWORK

The present disclosure relates to a method and apparatus for modifying behavior of a user via a communications network, e.g., a communications network of a network service provider.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
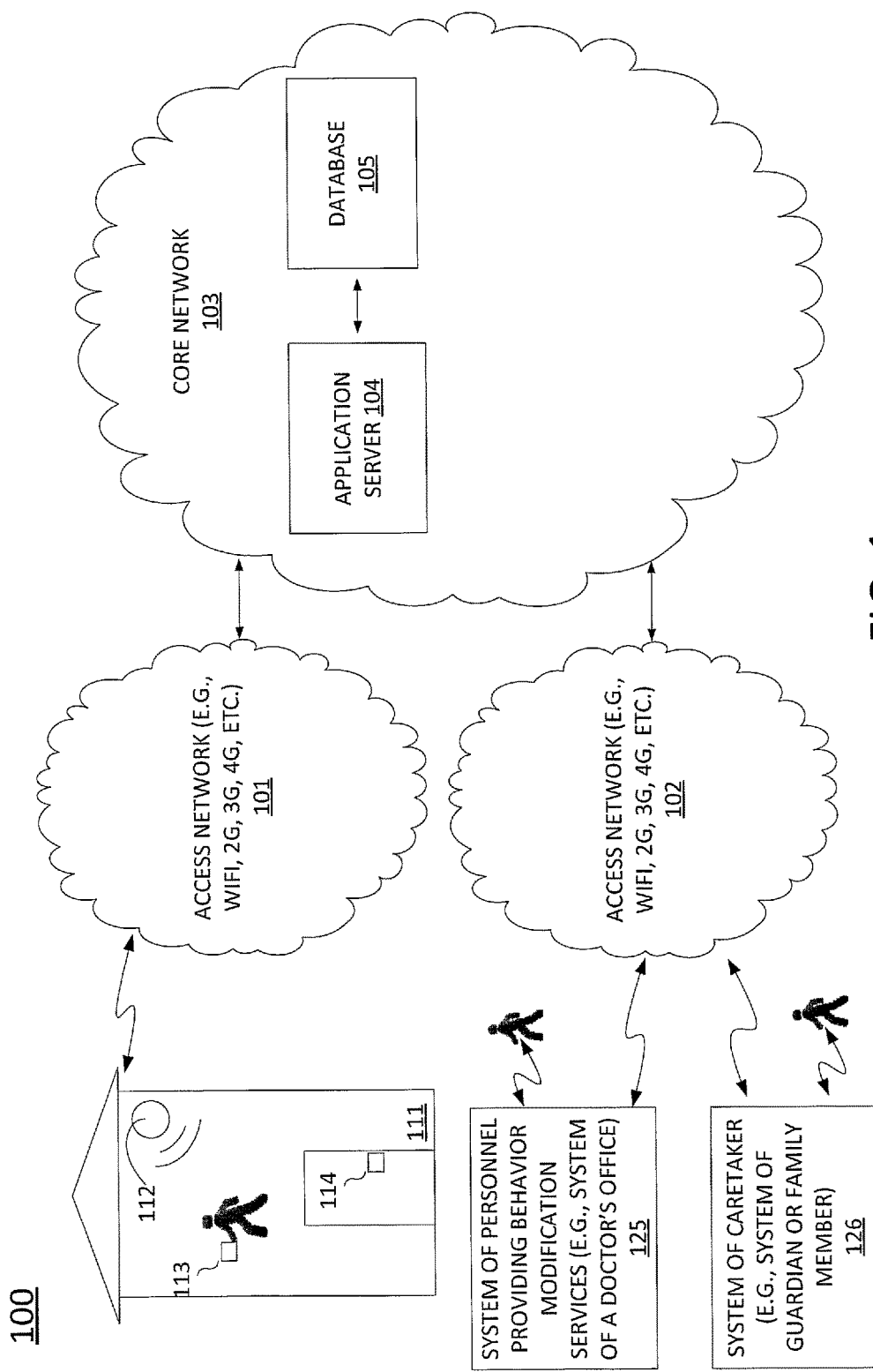
FIG. 1 illustrates an example network related to the present disclosure.

The present disclosure relates to a method and apparatus for modifying behavior of a user via a communication network, e.g., a communications network of a communications network service provider (broadly a network service provider). The teachings of the present disclosure can be applied via any type of wired or wireless communications network.

When a user wishes to modify a behavior, the user may find a qualified professional, e.g., a doctor or a psychiatrist, to treat the behavior. However, the qualified professional may not be continuously accessible. In addition, the effectiveness of a treatment is assessed by the qualified professional during visits, e.g., visits to a doctor's or psychiatrist's office. As such, modifications to treatment plans are made infrequently. In addition, when progress is slow, the person wishing to modify his/her behavior gets discouraged and the compliance level by the person to prescribed procedures may decrease. If the person then sees regression in the modifying of the behavior, he/she may become even more convinced that the modification of the behavior is unachievable.

In order to clearly illustrate the teachings of the current disclosure, the following terminologies will first be described:
Internet of Things;
Sensor;
Environmental sensor;
Biometric sensor; and
Actuator;

Internet of Things (IoT) refers to a network of objects, e.g., things having the necessary electronics, software, and network connectivity to collect and exchange data. For example, the Internet of Things may have Internet Protocol addresses for Internet connectivity. An object that is part of the IoT network may be referred to as an IoT object. An IoT object has the ability to send and/or receive data without requiring a human-to-human or a human-to-computer interaction. For example, a heart monitor that is implanted in a person, e.g., a user, may be assigned an Internet Protocol (IP) address and may send monitoring data to a server over the Internet. In another example, a carbon monoxide detector may detect carbon monoxide levels and may send an alert when a threshold is exceeded.

A sensor refers to a device that detects an event or a change in an environment or a living thing and provides an output that indicates the event or the change in the respective environment or living thing that is detected. The sensor may be categorized as either an environmental sensor or a biometric sensor. The sensor may be an IoT object.

An environmental sensor detects events or changes in a physical space, namely in the environment. For example, a sensor may be implemented to detect events or changes in the air within a physical space, e.g., air temperature, air pressure, air quality, etc. The detection of an event or a change in air quality may be for detecting toxins in the air, oxygen level, carbon dioxide level, carbon monoxide level, and so on. For example, a smoke detector may have sensors that detect temperature, ionization, photoelectric events and/or carbon dioxide level. Another type of environmental sensor may be implemented for detecting sound and/or vibration. For example, an audio sensor and/or a motion sensitive video sensor may be implemented. Yet another type of environmental sensor may be for detecting presence of an object or person in a physical space and/or a change in a location of an object or a person within the physical space. For example, a motion activated video sensor or audio sensor may be used to detect a presence of an object or person within the physical space or a change of location within the physical space. In another example, a contact based sensor may detect an event or a change when an entryway, e.g., a door, is opened. In another example, an environmental sensor may be designed for detecting biological events or changes in an environment, as opposed to on a living thing. For instance, a an environmental sensor may be for detecting chemicals, e.g., pesticides in water, for detecting airborne pathogens, for detecting toxins in a room, for detecting an ozone level, for detecting drug residues in a body of water, for detecting drug residues in a food item, etc.

In one example, the environmental sensor may also determine a level of a measured parameter for each change that is detected. For example, if a change in a sound level is detected, the environment sensor may also determine the sound level (broadly a measured parameter) in decibels. Other measured parameters may comprise: a temperature level, a vibration level, a brightness level, a moisture level, an odor or vapor level, and the like.

A biometric sensor may be implemented for detecting biological events or changes on or within a living thing. There are numerous types of biometric sensors for various applications. For example, a biometric sensor may be a Galvanic Skin Response (GSR) sensor for measuring electrical conductance on skin, an Electroencephalogram (EEG) sensor for detecting brainwave changes, an Electrocardiogram (ECG) sensor for detecting heartbeat changes, an Electromyography (EMG) sensor for detecting muscle activity, a sphygmomanometer for monitoring blood pressure, etc. For an illustrative example, the GSR sensor may be used to detect conduction on skin due to sweating. The change in the amount of sweating may be an indication of changes in physiological and/or psychological conditions of an individual.

In one embodiment, a biometric sensor may also be able to detect a composition of a biological component, e.g., a fluid comprising sweat. For instance, the composition of the sweat may be analyzed to detect and monitor various medical conditions of a patient. For example, the biometric sensor may be for one or more of: detecting a stress level of a patient, whether a patient is dehydrated, whether a patient's electrolyte levels are normal, whether a patient's metabolite levels are normal, whether a patient's protein levels are normal, whether a patient's amino acid levels are normal, and so on. An example of a sensor designed to detect a metabolite level is a sensor that detects glucose levels.

For both environmental and biometric sensors, the sensor of the present disclosure detects events or changes as applied for a specific individual user whose behavior is being modified. For example, if two people, person A and person B, live in a house and person A is seeking help to modify his/her behavior regarding sleep patterns, the sensor of the present disclosure is able to detect when person A is sleeping, waking up, being restless, sleep walking, etc. For example, biometric information of person A, video recording, audio recording, etc. may be used to identify which events that are detected by the sensor are associated with person A. Events in the same household that are detected for another person may then be omitted, if these events do not apply to the specific individual user being monitored.

However, in some scenarios, events that are detected by a sensor for another individual may apply to the specific individual whose behavior is being modified. For example, if persons A and B are couples sleeping in one bedroom, person A's sleep pattern may be associated with person B being a sleep walker. In another example, a stress level of person A may be associated with disagreements with person B. In such scenarios, events that are detected for another individual are further analyzed to determine whether these events should also be included as events that are applicable for the specific individual whose behavior is being modified.

An actuator refer to a device that comprises a mechanism (e.g., an electrical and/or mechanical device) to control an aspect of an environment or an object, e.g., an IoT object. In one example, an actuator may control the environment by converting energy into an action that affects the environment. For instance, for a room, an environmental actuator may control a light setting, a thermostat setting, a fan setting, a speaker setting, a voice tone setting of an automated announcement system, etc. In another example, an actuator may control a personal IoT object. For instance, for a specific person, the actuator may control a headphone (e.g., for providing an audio input to the person, playing soothing music, playing a verbal announcement, playing an alarm audio signal (e.g., a beep, a bing, a bong, a buzz and the like) and the like), a tactile device (e.g., for inducing a physical vibration), a medication dispenser (e.g., if a biometric sensor detected a medical condition that requires a dispensing of medication), and so on.

It should be noted that the actuator of the present disclosure may be an actuator that is triggered via any standard mechanism for triggering an actuator. For example, the actuator may be a hydraulic actuator that is triggered via a hydraulic power, a pneumatic actuator that is triggered by compressing air, an electric actuator triggered by an electrical current, a thermal actuator triggered by a thermal energy, a magnetic actuator triggered by a magnetic energy, a mechanical actuator triggered by motion (e.g., rotary motion), etc. The actuator may be an IoT object, as described above.

In one embodiment, the action that is performed by an actuator may be an action that is intended to make or induce a change in a condition of a physical space. For example, the action may change a temperature, an airflow, a lighting, an audio level, etc. in the physical space.

In one embodiment, the action that is performed by the actuator may be an action for alerting someone regarding a condition that is detected via a biometric sensor or an environmental sensor. In one example, the alert may be provided to an individual user within a physical space in which the condition is detected. In another example, the alert may be sent to the individual user who is being monitored via a biometric sensor. In another example, the alert may be a social message that is sent to the individual user. For example, the social message may be a posting at a social network website, a text message that is sent to the individual user's cell phone, etc. In one embodiment, the alert may be sent to a caregiver or a medical professional. For example, the alert may be sent to a doctor of the individual user who is being monitored via a biometric sensor. In one embodiment, the alert may be sent to a guardian, e.g., a family member of the individual user whose behavior is being monitored.

In one embodiment, the action that is performed by the actuator may be an action to induce a change in a detected biometric condition of an individual user. For example, the action may be to dispense a medication to lower the heart rate of the individual user. In one embodiment, the dispensing of the medication may be automated. For example, if a composition of a sweat of an individual user being monitored while sleeping indicates that the individual user needs additional insulin, the action may be to dispense insulin automatically, waking up the individual user (e.g., via ab audio or vibration output), and so on. In another example, if the composition of the sweat indicates that the individual user has low glucose level and a sensor indicates that the individual user has not eaten for several hours, the action may be to alert the individual user to consume food, to alert a caregiver to provide food to the individual user, to alert a doctor that the individual user seems to be not eating enough, etc.

FIG. 1 illustrates an example network 100 related to the present disclosure. In one illustrative embodiment, the network 100 comprises a home 111 with Internet of Things (IoT) devices 112-114, access networks 101-102, a core network 103, a system 125 (e.g., a server) of personnel providing behavior modification services (e.g., a physician, therapist, and the like), a system 126 (e.g., a server) of a caretaker (e.g., guardian, roommate, family member, friend, next-of-kin, and the like). The IoT devices 112-114 and the systems 125-126 may access services, e.g., Internet services, from the core network 103 via the access network 101 or 102.

The access networks 101-102 may comprise a Wireless-Fidelity (Wi-Fi) network, a cellular network (e.g., 2G, 3G, and the like), a long term evolution (LTE) network, and the like. The core network 103 may comprise any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Figure 3:
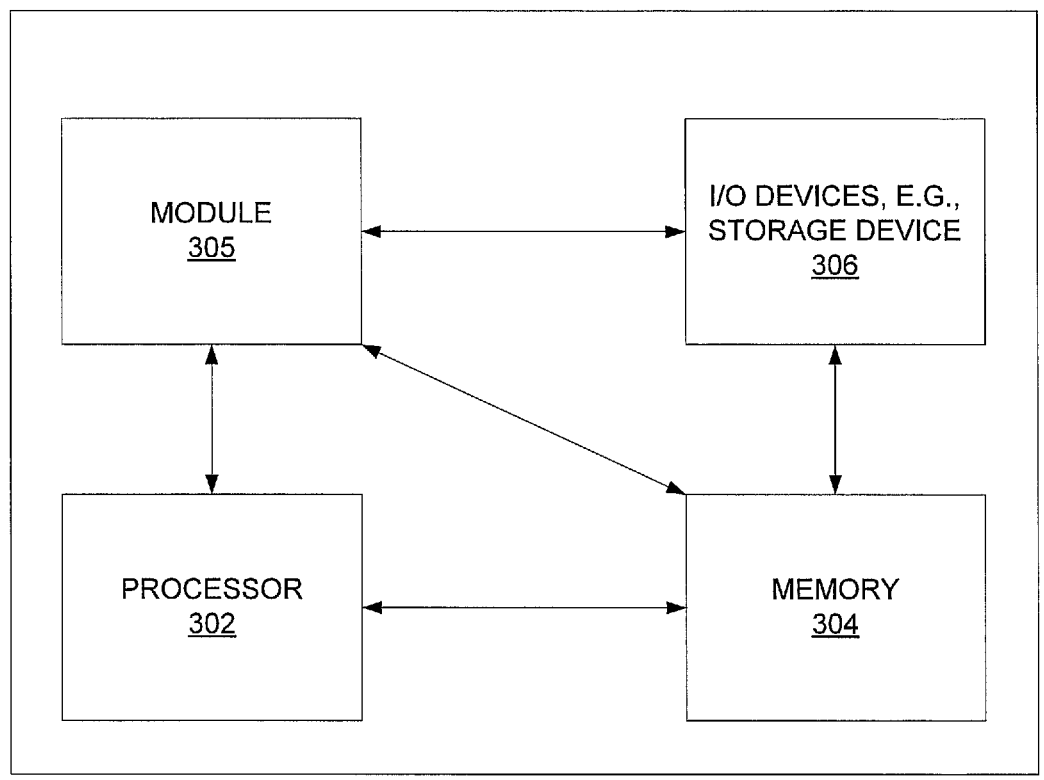
FIG. 3 depicts a high-level block diagram of a computer suitable for use in performing the functions described herein.

In one embodiment, the core network 103 may include an application server (AS) 104, and a database 105. For example, the AS 104 may be deployed as a hardware device embodied as a dedicated database server (e.g., the dedicated computer 300 as illustrated in FIG. 3). In one embodiment, the AS 104 is configured to perform the methods and functions described herein (e.g., the method 200 discussed below). For example, the network service provider provides a subscribed service where a user is able to modify a negative behavior. For example, the user may opt-in to the subscribed service to allow the network service provider the ability and authorization to monitor the user for negative behaviors that the user wants to modify. Some users may want encouragements or actions to be provided to them when the users are engaging in negative behaviors. In other words, a user may want to receive real time inputs from another party, e.g., the network service provider, to intercede when the users find themselves engaging in negative behaviors.

It should be noted that the network 100 may include additional networks and/or elements that are not shown to simplify FIG. 1. For example, the access network and the core network of FIG. 1 may include additional network elements (not shown), such as for example, base stations, border elements, gateways, firewalls, routers, switches, call control elements, various application servers, and the like.

Although a single database is shown in FIG. 1, the various types of data may be stored in any number of databases. For instance, various databases, e.g., a database for profiles of users, a database for data gathered from sensors, a database for controlling actuators, a database for caretakers, a database for personnel providing behavior modification services, etc., may be used. In addition, the various types of data may be stored in a cloud storage. In other words, the network service provider may implement the service for modifying behavior of the present disclosure by utilizing distributed IoT devices (e.g., distributed sensors and actuators) and user profiles that are established and stored in a cloud storage and/or a centralized server.

In one embodiment, the database 105 is used for storing various data, e.g., locations of sensors, capabilities of sensors, data gathered via sensors, locations of actuators, capabilities of actuators, profiles of users, etc. For example, the profile of a user may include one or more of: a listing of one or more positive behaviors, a listing of one or more negative behaviors, a psychological response intended for a type of positive or negative behavior, a physiological response intended for a type of positive or negative behavior, an action to be performed by an actuator in accordance with the psychological response and/or physiological response appropriate for a type of positive or negative behavior, one or more conditions for implementing the action, one or more triggering events for detecting the positive or negative behavior, and so on. The information populated in the profile can be provided by the individual user and/or with the help of third parties, e.g., guardians, care givers, medical professionals such as doctors, psychiatrists, therapists and the like.

In one embodiment, the database 105 may be used to store a plurality of actions to be performed along with one or more conditions for selecting a particular action of the plurality of actions to be performed. For example, the conditions for selecting the particular action may comprise on one or more of: a time of day, a type of behavior, a type of activity while experiencing the type of behavior, an analysis of the user's behavior, and an analysis of the user's response to previous actions, etc. For example, if the behavior is smoking and the person is attempting to reduce smoking over time, the action may be to send a message to the person indicating that a maximum number of allowed cigarettes for a pre-determined duration has been reached. In other words, the present method may track the number of cigarettes that have been smoked within a pre-determined time period by the user. In addition, if an analysis of the person's activities over time shows that the person smokes when stressed (e.g., from an analysis of sweating patterns), the action may be to turn on relaxing music, suggesting a break from an activity that is causing the stress, etc.

In one embodiment, the AS 104 is used for implementing the present method for modifying behavior of a user. The AS 104 of the present disclosure is for determining a baseline for any number of positive or negative behaviors for the user, identifying triggering events for each positive and negative behavior for which a baseline is determined, detecting when a triggering event has occurred for a positive or a negative behavior, and performing an action in response to the detection of the triggering event. The behavior may be a positive or negative behavior. If the behavior is a negative behavior, the selected action is intended to induce a change in the user's behavior for reducing or eliminating the negative behavior. If the behavior is a positive behavior, the action is intended to reinforce the positive behavior, e.g., providing a positive feedback, providing a reward, and the like.

For example, the AS 104 may be used to implement an action, wherein the action may comprise: triggering an environmental actuator, notifying personnel providing behavior modification services and/or a caretaker, and triggering a personal actuator (e.g., medication dispenser, a personal alert device (audio, vibration, and the like), etc. In yet another example, the AS 104 may be used for receiving an input from a third party for authorizing the triggering of a personal actuator. For instance, an action to dispense medication, reduce medication, increase medication, etc., may require an input (e.g., an authorization) from a doctor or caregiver prior to triggering a respective personal actuator.

Figure 2:
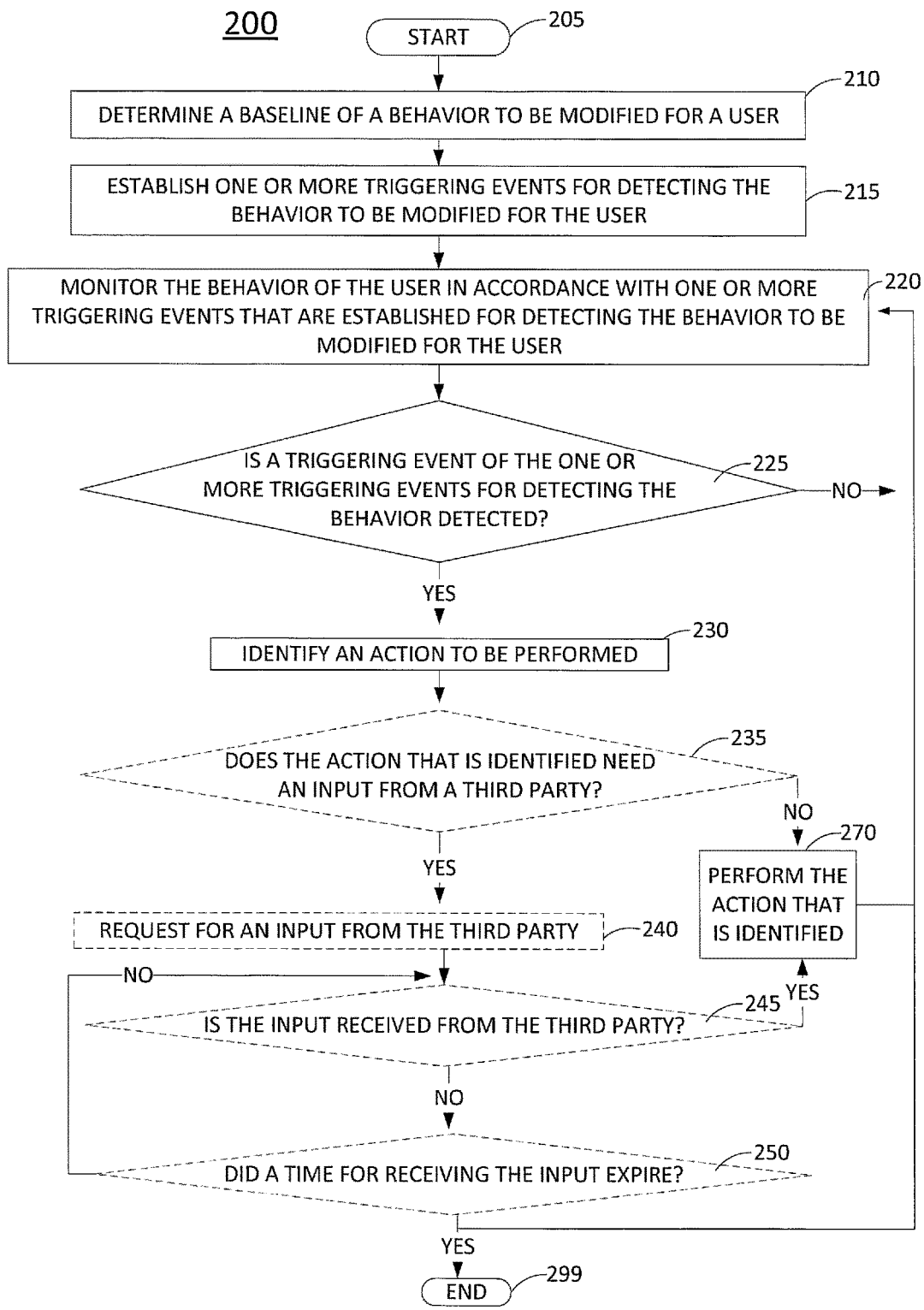
FIG. 2 illustrates a flowchart of an example method for modifying behavior of a user.

FIG. 2 illustrates an example flowchart of a method 200 for encouraging a user to modify a behavior in accordance with the present disclosure. In one embodiment, the method 200 may be implemented in an application server, e.g., an application server 104, or the processor 302 as described in FIG. 3. The method 200 starts in step 205 and proceeds to step 210.

In step 210, the processor determines a baseline of a behavior to be modified for a user. In one embodiment, the baseline of the behavior is determined in accordance with a profile of the user. For example, the profile may be stored in a database, e.g., the database 105 as described above. In other words, the present method attempts to deduce a foundation or a guideline associated with a behavior that a user wishes to alter or modify in some way.

For example, if a user wishes to stop smoking cigarettes, then it is necessary to determine a baseline as to the smoking behavior, e.g., the frequency of smoking per day, how long has the user been smoking, the brand of cigarettes favored by the user, the time of day that the user wants to smoke, the physical location that the user wants to smoke (e.g., at home, at work, at school, at a bar or restaurant, at a sports event venue, and so on), the type of events that induces the user to smoke, e.g., after a meal, drinking coffee while smoking and the like. In another example, if a user wishes to stop an eating disorder (e.g., eating too much or eating too little), then it is necessary to determine a baseline as to the eating disorder behavior, e.g., the frequency of eating or snacking per day, how long has the user been suffering from the eating disorder, the type of food favored by the user, the time of day that the user wants to eat, the physical location that the user wants to eat (e.g., at home, at work, at school, at a bar or restaurant, at a sports event venue, and so on), the type of events that induces the user to eat, e.g., while watching television, while attending a family function and the like. In another example, if a user wishes to stop an anger disorder (e.g., showing an inappropriate amount of verbal or physical aggression), then it is necessary to determine a baseline as to the anger disorder behavior, e.g., the frequency of wanting to lash out at someone per day, how long has the user been suffering from the anger disorder, the time of day that the user is likely to have an angry episode or confrontation with someone, the physical location that the user is likely to have an angry episode or confrontation with someone (e.g., at home, at work, at school, at a bar or restaurant, at a sports event venue, while driving in a vehicle and so on), the type of events that induces the user to have an angry episode or confrontation with someone, e.g., at a work function, at a school function, at a sports event, at a political event, while attending a family function and the like. The above examples are only illustrative and the present disclosure is not limited to any particular types of behavior to be modified.

The profile of a user may include personalized data gathered via any number of sensors. For example, a user may be provided with sensors to be installed in various places that the user frequents, e.g., a home, an office, a school, an entertainment venue, etc. The various sensors may then be used to gather data over time. In another example, a user may be provided with sensors that gather physiological data to be transmitted to a server. In another example, the user may provide biometric data that can be subsequently utilized for determining a presence of the user at a location where sensors are implemented. For example, when the presence of the user in the vicinity of an environmental sensor is detected, the user's identity is then authenticated using the gathered physiological data associated with the user, and then data associated with the user can be gathered for the location. The authentication of the user may be performed via facial recognition, voice recognition, retinal scan, or any other known form of recognition.

In one example, the profile of the user may also comprise one or more of: a list of one or more positive behaviors, a list of one or more negative behaviors, a psychological response, a physiological response, an action to be performed in response to a type of positive or negative behavior being detected. In one example, if the behavior is a positive behavior, the baseline of the positive behavior is determined for the user such that the behavior can be reinforced. In another example, if the behavior is a negative behavior, the baseline of the negative behavior is determined for the user such that an action is performed, where the action is intended to encourage a reduction or an elimination of the negative behavior.

In one embodiment, the action to be performed is an action selected from a plurality of actions. In one embodiment, the selecting of an action from the plurality of action is performed in accordance with one or more conditions established for selecting the action from the plurality of actions. For example, the one or more conditions for selecting the action from the plurality of actions may comprise one or more of: a time of day, a type of behavior, a type of activity being performed by the user while engaging in the behavior, an analysis of the behavior of the user, and an analysis of a response of the user to previously selected actions, etc. For instance, if previously selected actions have been successful in encouraging the user to reduce or quit smoking in the past, then the same actions may now be selected and taken for a current episode of modifying the same behavior of the user. In other words, the previously selected actions that have proven to be successful or effective may again be selected for modifying the same behavior that is now being modified, e.g., when a user relapses. The type of activity being performed while engaging in the behavior may comprise any activity, e.g., sleeping, walking, running, working, and the like. That is, the activity being performed when the triggering event is detected is logged such that an analysis may be performed on whether or not the type of activity is relevant to the user being engaged in a behavior. For example, if the person smokes when working but never while relaxing at home, the analysis may indicate a work related stress as being a possible triggering event for the behavior.

In optional step 215, the processor establishes one or more triggering events for detecting the behavior to be modified for the user. For example, suppose the behavior is smoking cigarettes and the user wishes to reduce smoking, or the behavior may comprise an eating disorder, an addiction (e.g., drugs, alcohol, gambling and the like), an anger management disorder, a sleep disorder, a compulsive behavior disorder and the like. A triggering event may be an event that is detected by a sensor. For example, the presence of smoke is a triggering event that can be detected via a smoke detector. Another triggering event may be the opening of a medicine cabinet, a refrigerator door, a pantry door, an entry door leading to an outdoor space, e.g., the user opening a door to go outside to smoke a cigarette, a user opening a refrigerator to gain access to food. Yet another triggering event may be a detected biometric condition such as a heart rate or a respiratory rate of a user, e.g., the detection of an elevated heart rate or an elevated breathing rate of the user due to a stress condition.

In one embodiment, the triggering events for detecting various types of behaviors may be established in advance by the user or a professional, e.g., a medical professional. The triggering events for a specific user may then be established by selecting from among a plurality of triggering events that are established in advance. For example, an elevated heart rate may be a triggering event for a possible panic attack or a triggering event for a potential angry outburst. In another example, drinking a cup of coffee may be a triggering event for a particular user to be tempted to smoke a cigarette. However, drinking coffee may not be a triggering event for another user who is trying to quit smoking. Thus, some triggering events may have universal applicability for certain types of behaviors, whereas other triggering events can be uniquely applicable only to certain individuals. Thus, in one embodiment, the set of triggering events can be set with the help of medical professionals and inputs from the users themselves.

In one example, the presence of the triggering event, in and of itself, may not be accurate as indicating the user engaging in a negative behavior, e.g., a user walking into a common area where there are smokers while the user is actually not smoking. In such scenarios, additional sensor data can be used to confirm the user engaging in a negative behavior, e.g., using biometric data, if available. For example, if smoke is detected, a camera (e.g., a web camera mounted on a computer display or a video camera covering a work area) can be used to capture an image of the user to determine whether an image of a cigarette can be detected on the user's mouth or the user's hand.

In step 220, the processor monitors the behavior of the user in accordance with the one or more triggering events that are established for detecting the behavior to be modified for the user. For the example above, the processor may monitor the smoking behavior of the user by receiving input from various sensors. The monitoring of the behavior may be performed even when the user is moving about different locations. For example, as the user moves from a first location to a second location, the user's presence may be detected at the second location. Then, the processor may start gathering data for monitoring the behavior from sensors in the vicinity of the second location. The gathering of data in the second location may require authentication of the user at the second location. In some scenarios, the user may be traveling with his/her cell phone. In such case, the presence at the second location may be detected when the user's cell phone communicates via a cell tower near the second location. If the user presence at the second location cannot be determined as described above (e.g., via cell phone location) and authenticated, biometric information (e.g., the user applied a thumb print scan or an iris scan to gain access to another work location) may be used for authenticating the user and continuing the monitoring at the second location.

In step 225, the processor determines whether a triggering event of the one or more triggering events for detecting the behavior is detected. If the triggering event is detected, the method proceeds to step 230. Otherwise, the method proceeds to step 220 to continue monitoring. For the example above, the user may have been detected exiting a door leading to an outdoor space where workers often congregate for smoking cigarettes, and a camera has captured an image of the user with a detected cigarette in the user's mouth. If the behavior is detected, the method then proceeds to step 230.

In step 230, the processor identifies an action to be performed when the triggering event of the one or more triggering events for detecting the behavior is detected. For example, the processor may identify an action to alert the user, an action to alert a doctor, an action to alert a care giver or guardian, e.g., a family member, an action to change the environment of the user via an actuator, etc. For example, a message (e.g., a text message or an email) can be sent to the user's mobile endpoint device, e.g., a smart phone, a computing tablet, a laptop computer, encouraging the user to desist the negative behavior. In another example, a picture of the user's children can be displayed on the user's mobile endpoint device to remind the user that the detected negative behavior will negatively impact the user's children. In another example, a message (e.g., a text message or an email) can be sent to the user's doctor or care giver. In another example, an audio message can be broadcasted to the outdoor environment, e.g., requesting the user to return to work or to return indoor where smoking is not allowed.

In optional step 235, the processor determines whether the action that is identified needs an input from a third party. If the action that is identified needs an input from the third party, the method proceeds to step 240. Otherwise, the method proceeds to step 270. For example, when the action involves the dispensing of a medication, the action may need an input from a medical professional, e.g., a doctor, a nurse, etc. In another example, if the action is sending an audible message to the user and the user is sleeping, the action may need an input from a caregiver of the user to authorize sending the audible message while the user is sleeping.

In optional step 240, the processor requests for an input from the third party. For example, the processor sends a request to a system of a doctor's office, e.g., system 125 of FIG. 1, requesting an input on the action.

In optional step 245, the processor determines whether the input is received from the third party. For example, the processor may determine whether a reply is received from the doctor's office approving the action, modifying the action, or rejecting the action. If the input is not received, the method proceeds to step 250. Otherwise, the method proceeds to step 270.

In optional step 250, the processor determines whether a time for receiving the input has expired. If the time for receiving the input has expired, the method proceeds either to step 299 to end processing the current monitoring or to step 220 to continue monitoring the behavior. Otherwise, the method returns to step 245.

In step 270, the processor performs the action that is identified. If an input is received for the action that is identified, the method performs the action in accordance with the input. If the action did not need an input from a third party, the processor performs the action without any input from a third party. For example, if the optional steps 235, 240, 245 and 250 are not performed, the processor proceeds from identifying of an action to be performed to performing the action, without an input from a third party. The method then either returns to step 220, or to step 299 to end the process.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

It should be noted that the above described method can be deployed with various different implementations. For example, the action that is performed may comprise triggering an environmental actuator. In one embodiment, the environmental actuator is for performing one or more of: modifying a setting of a thermostat, modifying a setting for an airflow (e.g., an HVAC system), modifying a setting for an entertainment system (e.g., playing music from a speaker, playing an audible message from a speaker, turning on/off a television, playing a video on a display, displaying an image on a display, and so on), modifying a setting of a lighting device (e.g., changing the lighting level in a room), modifying a setting for relaxation device (e.g., turning on a tactile device, turning on a massaging device on a chair), etc. For example, the setting may alter a temperature of a room, turn-on a fan, play relaxing music, play an audible warning message, turn-on a massage device on a chair, change the lighting level or color lighting in a room, etc.

In one embodiment, the action that is performed comprises triggering a personal actuator. In one embodiment, the personal actuator comprises a device for outputting a sound, generating a tactile sensation, and the like. In one embodiment, the personal actuator may comprise a device for dispensing a medication.

In one embodiment, the action that is performed comprises notifying a third party. In one embodiment, the third party may comprise a medical professional. In one embodiment, the third party comprises one or more of: a caregiver, a next-of-kin, a friend, a co-worker, a teacher, and the like.

In one embodiment, the action that is performed comprises sending a message to the user. For example, the user may wish to get feedback when a triggering event is detected.

In one example, the present method for modifying behavior of a user of the present disclosure is implemented via a dedicated database server. Furthermore, in one embodiment, the present method for modifying behavior of a user can be provided in the dedicated database server, e.g., AS 104, operated and managed by a network service provider. For example, the network service provider may operate one or more communications networks to provide one or more services such as telephony services, cellular services, data services (e.g., data access and transfer services, Internet access services, and the like), multimedia delivery services (e.g., multimedia programming delivery services such as movies, videos, music and the like), and the like.

As such, the present disclosure provides at least one advancement in the technical field of modifying behavior of the user. This advancement improves efficacy of actions for behavior modification by providing an appropriate action that is reflective of a baseline behavior of a user and a triggering event that is based on the baseline behavior of the user.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for modifying behavior of a user, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or each of the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 305 for modifying behavior of a user (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for modifying behavior of a user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:

determining, via a processor of an application server of a communications network operated by a network service provider, a baseline of a behavior to be modified for a user, the baseline comprising at least one triggering event that is established for the behavior to be modified and at least one action to be taken when the at least one triggering event is detected, wherein the baseline of the behavior is determined in accordance with a profile of the user, wherein the profile of the user comprises: a listing of at least one positive behavior for the user, a listing of at least one negative behavior for the user, and a listing of one or more actions to be taken in accordance with the listing of the at least one positive behavior for the user and the listing of the at least one negative behavior for the user, wherein the at least one action is at least one of the one or more actions, wherein the behavior is a way in which the user conducts himself;

detecting, via the processor, the at least one triggering event that is established for the behavior to be modified for the user based on data received from a sensor via the communications network;

identifying, via the processor, the at least one action to be performed when the at least one triggering event is detected; and performing, via the processor through the communications network, the at least one action that is identified, wherein the at least one action comprises triggering a personal actuator of the user, wherein the personal actuator is a tactile device for inducing a physical vibration.

2. The method of claim 1, wherein the profile of the user further comprises personalized data gathered via the sensor.

3. The method of claim 2, wherein the sensor comprises an environmental sensor.

4. The method of claim 2, wherein the sensor comprises a biometric sensor.

5. The method of claim 1, wherein the at least one action that is performed comprises notifying a third party.

6. The method of claim 5, wherein the third party comprises one or more of: a medical professional, a caregiver, a next-of-kin, and a friend.

7. The method of claim 1, wherein the at least one action that is performed comprises sending a message to the user.

8. The method of claim 1, wherein the at least one action that is performed further comprises triggering an environmental actuator.

9. The method of claim 8, wherein the environmental actuator is for performing one or more of: modifying a setting of a thermostat, modifying a setting for an airflow, modifying a setting for an entertainment system, modifying a setting for a lighting device, and modifying a setting for a relaxation device.

10. The method of claim 1, further comprising:
   determining whether the at least one action that is identified needs an input from a third party prior to performing the at least one action; and
   requesting the input from the third party, when the at least one action that is identified needs the input from the third party.

11. The method of claim 10, wherein the input from the third party comprises approving the at least one action that is identified, modifying the at least one action that is identified, or rejecting the at least one action that is identified.

12. The method of claim 10, wherein the performing the at least one action that is identified, is in accordance with the input from the third party, when the at least one action that is identified needs the input from the third party.

13. The method of claim 1, wherein the at least one action to be performed is an action selected from a plurality of actions.

14. The method of claim 13, wherein the at least one action is selected from the plurality of actions in accordance with one or more conditions.

15. The method of claim 14, wherein the one or more conditions comprise one or more of: a time of day, a type of behavior, a type of activity being performed by the user when the at least one triggering event is detected, an analysis of the behavior of the user, and an analysis of a response of the user to one or more previously selected actions.

16. The method of claim 15, wherein the one or more previously selected actions comprise actions for modifying the behavior.

17. A non-transitory computer-readable storage device storing a plurality of instructions which, when executed by a processor of an application server of a communications network operated by a network service provider, cause the processor to perform operations, the operations comprising:
   determining a baseline of a behavior to be modified for a user, the baseline comprising at least one triggering event that is established for the behavior to be modified and at least one action to be taken when the at least one triggering event is detected, wherein the baseline of the behavior is determined in accordance with a profile of the user, wherein the profile of the user comprises: a listing of at least one positive behavior for the user, a listing of at least one negative behavior for the user, and a listing of one or more actions to be taken in accordance with the listing of the at least one positive behavior for the user and the listing of the at least one negative behavior for the user, wherein the at least one action is at least one of the one or more actions, wherein the behavior is a way in which the user conducts himself;
   detecting the at least one triggering event that is established for the behavior to be modified for the user based on data received from a sensor via the communications network;
   identifying the at least one action to be performed when the at least one triggering event is detected; and
   performing through the communications network the at least one action that is identified, wherein the at least one action comprises triggering a personal actuator of the user, wherein the personal actuator is a tactile device for inducing a physical vibration.

18. An apparatus comprising:
a processor of an application server of a communications network operated by a network service provider; and
a computer-readable storage device storing a plurality of instructions which, when executed by the processor, cause the processor to perform operations, the operations comprising:
   determining a baseline of a behavior to be modified for a user, the baseline comprising at least one triggering event that is established for the behavior to be modified and at least one action to be taken when the at least one triggering event is detected, wherein the baseline of the behavior is determined in accordance with a profile of the user, wherein the profile of the user comprises: a listing of at least one positive behavior for the user, a listing of at least one negative behavior for the user, and a listing of one or more actions to be taken in accordance with the listing of the at least one positive behavior for the user and the listing of the at least one negative behavior for the user, wherein the at least one action is at least one of the one or more actions, wherein the behavior is a way in which the user conducts himself;
   detecting the at least one triggering event that is established for the behavior to be modified for the user based on data received from a sensor via the communications network;
   identifying the at least one action to be performed when the at least one triggering event is detected; and
   performing through the communications network the at least one action that is identified, wherein the at least one action comprises triggering a personal actuator of the user, wherein the personal actuator is a tactile device for inducing a physical vibration.

19. The apparatus of claim 18, wherein the at least one action that is performed further comprises triggering an environmental actuator.

20. The apparatus of claim 19, wherein the environmental actuator is for performing one or more of: modifying a setting of a thermostat, modifying a setting for an airflow, and modifying a setting for a relaxation device.

* * * * *